May 30, 1967 W. OSTBERG 3,322,416
DEVICE FOR REMOVING CLINKER FROM THERMOCOUPLE PROBE
Filed Dec. 27, 1963 2 Sheets-Sheet 1
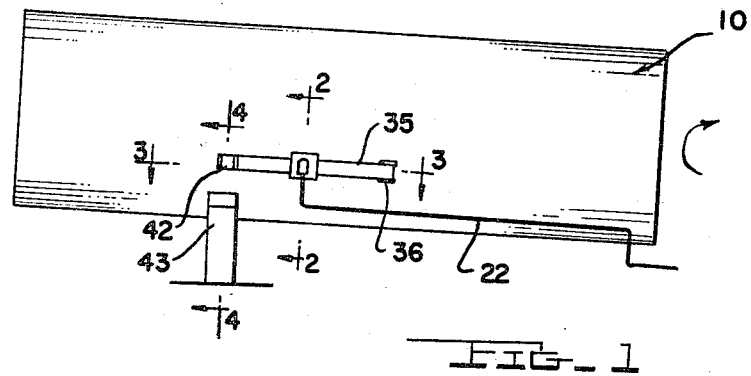
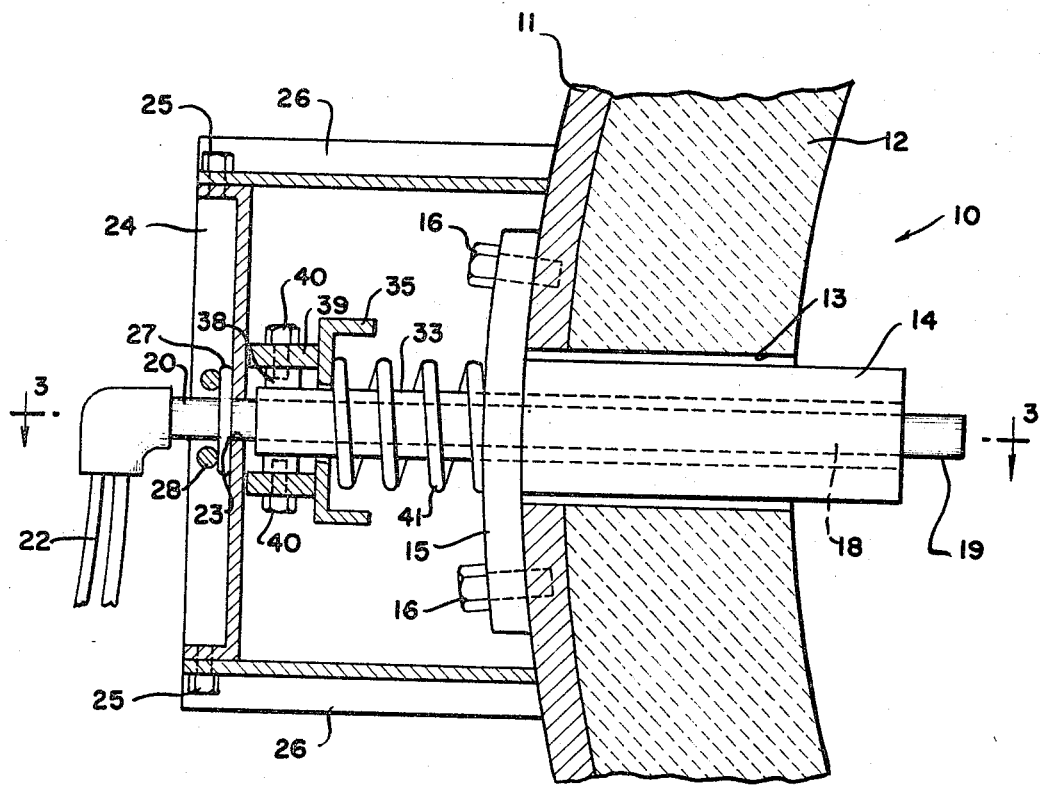
INVENTOR.
WERNER OSTBERG
BY Cullen, Sloman & Cantor
ATTORNEYS May 30, 1967    W. OSTBERG    3,322,416
DEVICE FOR REMOVING CLINKER FROM THERMOCOUPLE PROBE
Filed Dec. 27, 1963    2 Sheets-Sheet 2
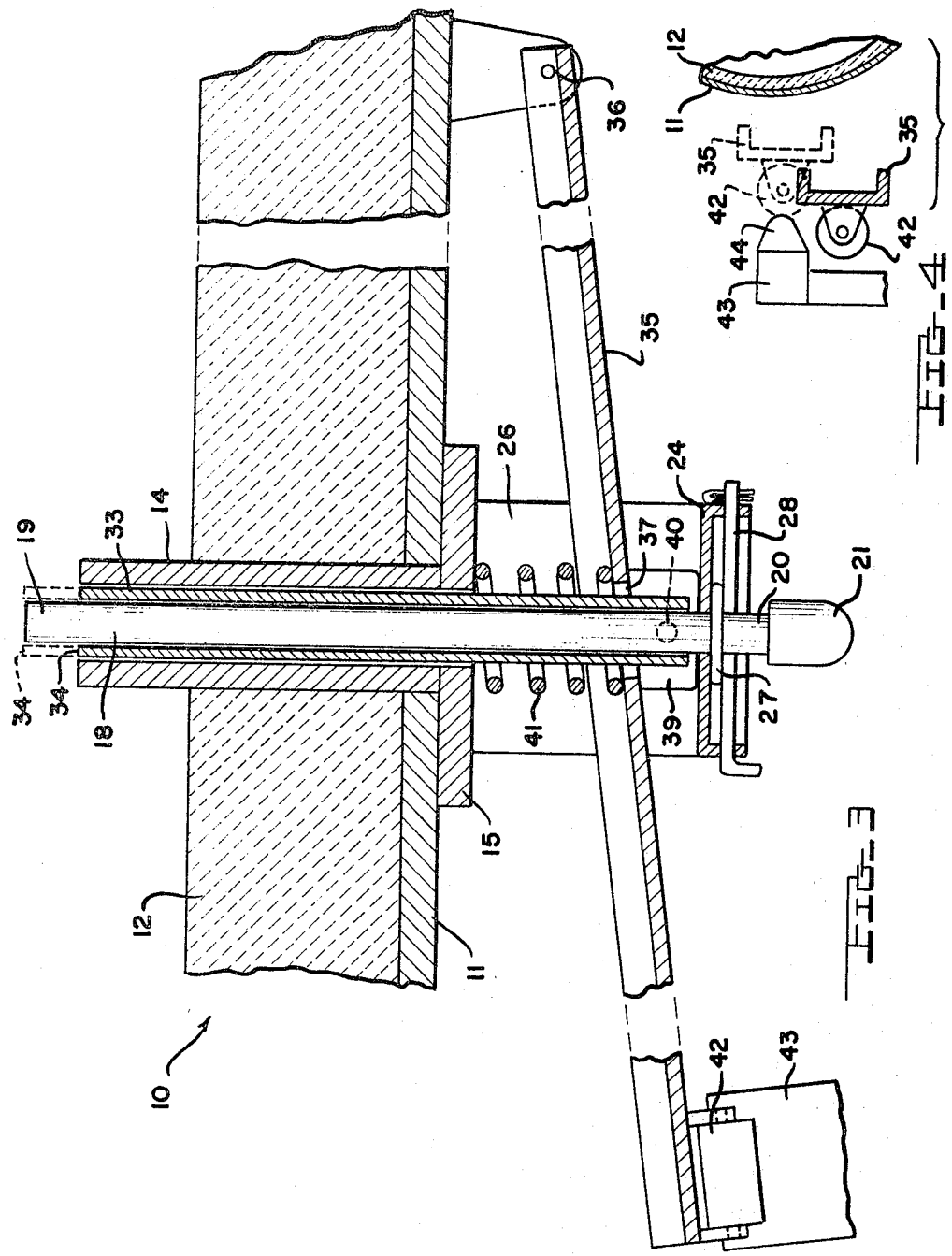
INVENTOR.
WERNER OSTBERG
BY
*Cullen, Sloman & Cantor*
ATTORNEYS

United States Patent Office 3,322,416
Patented May 30, 1967

3,322,416
DEVICE FOR REMOVING CLINKER FROM
THERMOCOUPLE PROBE
Werner Ostberg, Milan, Mich., assignor to Dundee
Cement Company, Dundee, Mich.
Filed Dec. 27, 1963, Ser. No. 333,959
2 Claims. (Cl. 263—33)

ABSTRACT OF THE DISCLOSURE

A cleaning tube is telescoped over a kiln thermocouple probe, and is periodically driven over the otherwise exposed inner end of the probe to clean kiln material off of the probe. Actuation of the tube is accomplished by a lever pivoted to the exterior of the kiln and cammed inwardly by a fixed striker engaged by the lever on each revolution of the kiln.

---

This invention relates to a device for removing clinker from a thermocouple probe.

In the large, rotatable kilns used in the manufacture of cement and the like material, thermocouples are used to determine temperatures at various points within such kilns. The thermocouples are usually mounted within probes, which are long tubes inserted through openings in the wall of the kiln. The probes each have an inner end portion located within the kiln and an outer end portion extending outwardly of the kiln, the inner end portion containing the thermally sensitive part of a thermocouple for registering the temperature. As the kiln rotates, the probe inner end portion is at times in a low position where it is covered with the hot kiln material, such as hot clinker, and at times it rotates to a point above the kiln contents.

Hot kiln material, particularly clinkers and the like used in the manufacture of cement, are sticky and tend to stick to and cover the probe inner end portion, building up a larger and larger coating as time goes by until ultimately the coating becomes so large that it breaks off of its own weight. This coating, in effect, acts as an insulation for the probe with the result that the temperature measurements become more and more inaccurate as the coating builds up until the point where the coating breaks off when the temperature reading rapidly returns to a more accurate reading. The end result is that such temperature readings are quite unreliable and function only as a guide upon which an experienced operator must base his judgment and decide upon the changes and regulations of temperature within the kiln. It can be seen, that since human judgment is required, it has not been possible up to this time to automate this type of equipment such as by a computor control.

Hence, it is an object of this invention to provide a device for regularly removing clinker and the like deposits which form upon the thermocouple probe and to prevent clinker build-up thereon so that the thermocouple registers accurately at all times, thus making it possible to eliminate human judgment and substitute machine controls for the overall temperature control of the kiln.

A further object of this invention is to provide a simplified thermocouple probe cleaner which regularly operates during the rotation of the kiln to provide a short, rapid, slicing-cleaning stroke for regularly knocking off the hard and sticky clinker adhered to the probe inner end and wherein the mechanism or device is so formed that it does not interfere with periodic removal of the probe, per se, from the kiln for repair and replacement without the need for shutting down operation of and rotation of the kiln.

These and other objects and advantages will become apparent upon reading the following description, of which the attached drawings form a part.

In these drawings:

FIG. 1 is a schematic, elevational view of a rotary kiln useful in the manufacture of cement.

FIG. 2 is an enlarged cross-sectional view taken in the direction of arrows 2—2 of FIG. 1.

FIG. 3 is an enlarged cross-sectional view taken in the direction of arrows 3—3 of FIG. 1 and 3—3 of FIG. 2.

FIG. 4 is a schematic view taken in the direction of arrows 4—4 of FIG. 1.

For illustration purposes, the drawings show a horizontally elongated, cylindrically shaped, rotary kiln 10 whose axis is tilted relative to the horizontal. The kiln is provided with means (not shown) for rotating it as indicated by the arrow in FIG. 1. The kiln is formed of an outer, metallic curved wall 11 which is lined on its inside surface with a refractory material 12.

A thermocouple opening 13 is formed in the wall of the kiln and fitted within that opening is a protective tube 14 having secured to its outer end a base plate 15 secured by bolts 16 to the kiln wall.

Fitted within the protective tube is the thermocouple probe 18 whose inner end portion 19 is exposed and located within the kiln for exposure to the kiln temperature. The probe is formed of an elongated tube whose inner end is closed off and within which the conventional bi-metal wires are placed, with the heat sensitive junction of the wires being at the inner end 19.

The probe outer end portion 20 is provided with a conventional elbow fitting 21 through which extend electrical wires 22 which connect to the thermocouple wires and to a temperature reading device, such as a conventional direct reading meter or a conventional recording device.

The outer end portion of the probe passes through an opening 23 in the base 24 of a U-shaped bracket having legs 26, each secured at one end by bolts 25 to the base 24 and at its opposite end welded or otherwise fixed to the kiln wall 11. Thus, the base 24 can be removed by removing the bolts 25.

A collar 27 is permanently fastened to the outer end portion of the probe and is abutted against the base 24 and held in place by means of removable pins 28. Thus, the probe may be removed from the kiln for replacement or repair simply by removing pins 28 and then pulling the probe outwardly. This permits rapid removal of the probe so as to not interfere with the rotation of or the operation of the kiln.

The device for removing clinker from the probe is in the form of an elongated tube 33 which closely surrounds the probe and fits within the protective tube 14 for telescopic movement upon the probe. Normally, the inner end 34 of the tube is located outwardly of the inner end of the protective tube 14 so that the probe inner end is completely exposed. However, periodically the cleaning tube 33 is rapidly and forcefully moved inwardly, as shown by the dotted line position in FIG. 3, to sharply strike and slice through clinker build-ups upon the probe inner end 19 to thereby break up and remove such build-ups.

The mechanism for moving the cleaning tube includes a lever 35, arranged parallel to the axis of the kiln and pivotally connected at 36 to the kiln wall 11. The cleaning tube and the probe pass through an opening 37 formed in the lever approximately mid-way between the ends of the lever and the cleaning tube is connected to the lever by means of lugs 38 permanently secured, as by welding, to the outer end of the tube, which lugs are connected by screws 40 to similar lugs 39 welded or otherwise secured to the lever.

The lugs 39 on the lever, also normally contact the base 24 of the U-shaped bracket to limit the outward movement of the lever which is spring-urged outwardly by means of a coil spring 41 arranged between and in contact with the lever and the base plate 15.

The opposite end of the lever is provided with a roller 42 which strikes against a striker member 43 arranged on a fixed support (not shown), such as the ground along side of the kiln, but in the path of the lever roller so that as the kiln rotates, the roller 42, once each rotation, strikes the rounded nose 44 (see FIG. 4) of striker member 43 to thereby provide a sharp inward impact to the end of the lever which moves it inwardly, towards the inside of the kiln, and thereby rapidly, with a vigorous stroke, moves the cleaning tube 33 inwardly to break up and slice through the clinker coating formed on the probe 19.

Normally, the striker member is so located as to strike the lever shortly after the probe rises above the clinker content located on the lowermost part of the kiln.

It can be seen, that the clinker, is easily removed by what in effect is a fast, hard chisel or slicing blow by the end of the cleaning tube 33. Thus, by avoiding the clinker build-up upon the probe, the temperature reading from the probe conforms at all times to the temperature to be measured in the kiln.

This invention may be further developed within the scope of the following claims. Accordingly, it is desired that the foregoing description be read as being merely illustrative of an operative embodiment of this device and not in a strictly limited sense.

I now claim:

1. In a rotating kiln containing hot clinker material and having a temperature measuring elongated probe extending through an opening formed in the kiln wall with a probe inner end portion located within the kiln and a probe outer end portion located outside of the kiln; the improvement comprising: an elongated tube closely surrounding said probe and extending through the opening in the kiln wall, with an outer end located outside the kiln and an inner end normally located at, but not covering, said probe inner end portion; an elongated lever arranged parallel to the axis of rotation of the kiln and having one end pivotally secured to the outside of the kiln wall and an opposite end formed as a cam; an opening formed in the lever between its ends and the tube and probe extending through said lever opening, with the tube being secured to the lever adjacent said lever opening; a coil spring surrounding the tube and being positioned between and in contact with the lever and the kiln wall for spring urging the lever away from the kiln wall; a U-shaped bracket arranged transversely of the lever at said lever opening and having its legs secured to the kiln wall, with the lever fitted within the base of the U-shaped bracket; an opening formed in the base of the bracket and the probe outer end passing through said base opening and being removably secured to the bracket; and a striker means permanently positioned adjacent the kiln in the path of the lever cam end to strike said cam end at each rotation of the kiln for rapidly forcing the lever and its attached tube in a direction inwardly of the kiln so that the tube momentarily telescopes over the probe inner end for removing clinker adhered thereto, with said spring returning the lever and tube to their normal position after the lever passes the striker means.

2. In a rotating kiln for containing kiln material, and having a temperature measuring elongated probe extending through the wall of the kiln, the probe having an exposed inner end portion located within the kiln and an outer end portion, located outside and removably fastened to the kiln wall, the improved probe cleaning device which comprises:

an elongated tube, closely and telescopically fitted around the probe and mounted for reciprocal movement on said probe, said tube extending from the probe inner end portion to a point close to the probe outer end;

biasing means normally biasing said tube toward the outer end of said probe so as to leave the inner end portion of said probe exposed;

tube actuating means for regularly and sharply driving the tube inwardly over said probe inner end and comprising an elongated lever pivotally mounted at one end to the kiln wall and having a striker follower at its opposite ends, said lever being secured at a point intermediate its ends to the outer end of said tube;

and a fixed striker positioned adjacent the kiln and in the path of said striker follower as it rotates with said kiln, whereby said tube is driven inwardly over the inner end of said probe, at least once per revolution of the kiln as said striker follower engages said striker, to thereby slice through and break off kiln material adhered to the inner end of said probe.

References Cited

UNITED STATES PATENTS 1,991,371   2/1935   Blanckenburg _____ 136—242 X

FOREIGN PATENTS 68,567   11/1944   Norway.

FREDERICK L. MATTESON, Jr., *Primary Examiner.*

D. A. TAMBURRO, *Assistant Examiner.*